Aug. 30, 1949.　　　　D. L. SMITH　　　　2,480,308
SCARFING MACHINE
Filed May 7, 1946　　　　　　　　　　　2 Sheets-Sheet 1

INVENTOR
DONALD L. SMITH
BY
ATTORNEYS

Aug. 30, 1949.   D. L. SMITH   2,480,308
SCARFING MACHINE
Filed May 7, 1946   2 Sheets-Sheet 2
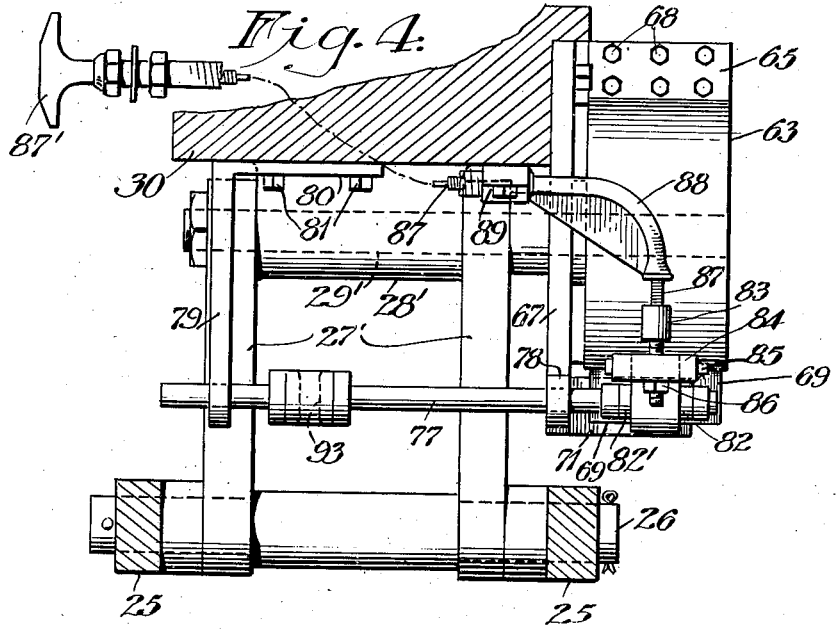
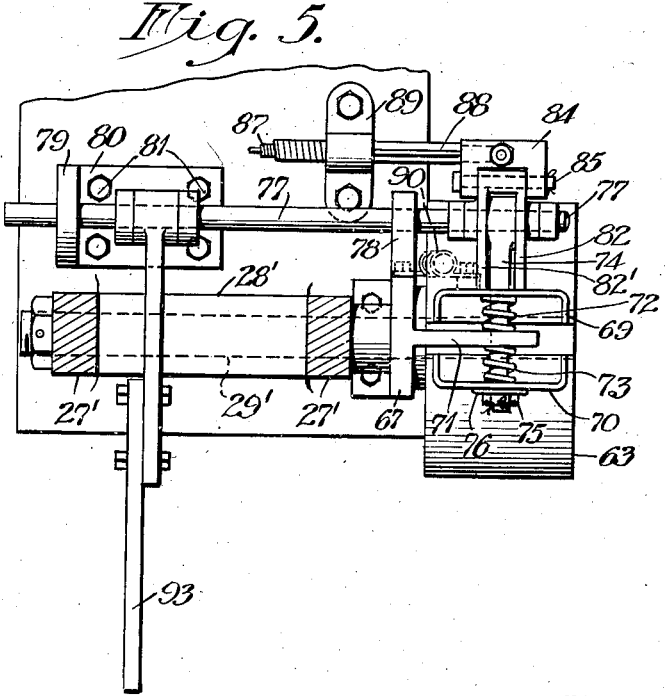
INVENTOR
DONALD L. SMITH
BY
ATTORNEYS Patented Aug. 30, 1949

2,480,308

UNITED STATES PATENT OFFICE 2,480,308

SCARFING MACHINE

Donald L. Smith, Dunellen, N. J., assignor to Air Reduction Company, Incorporated, a corporation of New York Application May 7, 1946, Serial No. 667,949

6 Claims. (Cl. 266—23)

This invention relates to scarfing machines, i. e., machines for removing surface metal from billets, blooms, ingots, and the like, by projecting a row of oxygen jets against the surface of the work at an angle to the surface while the surface metal is at kindling temperature and while the work-piece is moving relative to the oxygen jets to thereby progressively remove the surface metal by thermochemical action. More particularly, the invention relates to improvements in mobile billet scarfing machines of the type shown in the patent to J. L. Anderson No. 2,380,569, issued July 31, 1945.

The machine shown in the above-mentioned Anderson patent has a torch carriage which moves the scarfing torch lengthwise along the top surface of the billet during the scarfing operation. The scarfing torch is supported by a folding parallelogram linkage which permits it to float vertically so that the torch tip can follow vertical variations in the billet surface as it is moved along the surface and in contact with it by the torch carriage. The tip is of the multi-jet block type having a row of jet passages extending transversely of the billet from which jets of scarfing oxygen are directed against the billet surface and also having a row of orifices for preheating flames which are directed against the billet surface to raise the metal to kindling temperature. Before starting the actual scarfing of the billet the torch carriage is brought to a position in which the torch tip is located over one end of the billet. The tip is then lowered until the shoe on its bottom face is in contact with the top surface of the billet. The torch tip is allowed to remain in this position long enough for the row of preheating flames to raise the surface metal to kindling temperature, and then the scarfing oxygen is turned on and the torch carriage started to advance the torch tip along the surface to be scarfed. This necessarily leaves an unscarfed area at one end of each billet on which the torch tip was supported during the preheating period.

One object of the invention is to eliminate the unscarfed area on the billets when scarfing by means of a machine of the type above described or by means of a similar machine in which it has heretofore been necessary to allow the tip of the scarfing torch to rest on the end of the billet during the preheating period. According to the invention a brake is associated with the torch-supporting parallelogram linkage which can be manually applied to render the parallelogram linkage rigid. Thus by applying the brake the torch tip can be held at the desired height even though it is not supported by the billet, thereby making it possible to support the torch tip during the preheating period in advance of the end of the billet and at the proper level for the preheating flames and the scarfing oxygen to impinge upon the billet surface over an area starting from the very end of the billet. The apparatus can therefore be used for scarfing the entire length of the billet or other work-piece. When the torch tip is started in motion at the end of the preheating period and reaches a position over the end of the billet, the brake is automatically tripped to release it, and from that time on the shoe of the torch tip slides in contact with the billet surface and is free to follow its vertical variations since the folding parallelogram linkage is then rendered flexible again by the release of the brake.

The invention is illustrated in the accompanying drawings, in which:

Fig. 4 is a horizontal section taken on the line 4—4 of Fig. 3; and

Fig. 5 is a vertical section taken on the line 5—5 of Fig. 4.

Figure 1:
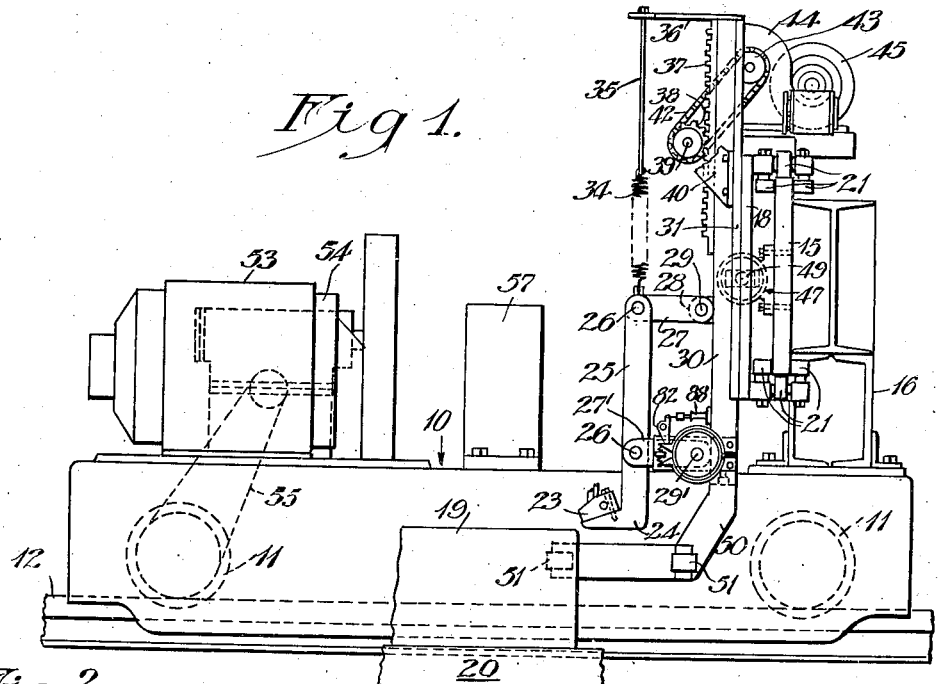
Fig. 1 is a side elevation of a scarfing machine of the type disclosed in the above-mentioned Anderson patent having the present improvements applied to it.

Only so much of the scarfing machine of the above-mentioned Anderson patent is shown in the drawings as will give an understanding of how the present invention can be embodied in it and embodied in scarfing machines of a similar type. The scarfing machine shown in the drawings comprises a base or carriage 10 with four wheels 11 that run on track rails 12. A cantilever arm 15 is rigidly connected with a support 16 that extends upwardly from the base 10. In Fig. 1 the cantilever arm 15 extends toward the reader in a plane at right angles to the sheet on which Fig. 1 is drawn and therefore only the end of the cantilever arm appears in this figure. However, a portion of the cantilever arm is shown in the perspective view of Fig. 2.

A frame 18 (Figs. 1 and 2) is movable along the arm 15 transversely of the track rails 12 and transversely of a billet 19 that rests on a support 20 and that extends parallel to the rails. The frame 18 has anti-friction rollers 21 that contact with the guide surfaces on the top, bottom, and both sides of the cantilever arm 15.

A torch whose tip is shown at 23 is supported on a front member 25 of a folding parallelogram linkage. The lower end of the member 25 constitutes a shoe 24 extending under the torch tip and to which the tip is directly connected. Shafts 26 extending across the front member 25 of the parallelogram linkage connect the front member with the forward ends of an upper pair of links 27 and a lower pair 27'. The rear ends of the upper links 27 are pivotally connected with a lug 28 by a shaft 29 and the rear ends of the lower links 27' are connected with a lug 28' (Fig. 2) by a shaft 29' which passes through the lug. In Fig. 1 the folding parallelogram linkage is shown in side elevation and therefore this figure does not show all four of the links, but all four are shown in perspective in Fig. 2. The lugs 28 and 28' form integral parts of a slide 30 that is mounted to move up and down in a guide 31 on the transversely movable frame 18. The folding parallelogram linkage permits movement of the front member 25 of the linkage such that it always remains parallel to the slide 30 and therefore permits vertical floating of the torch tip 23.

A part of the weight of the torch tip 23, shoe 24, front member of the parallelogram linkage, and the links 27 and 27' is counterbalanced by a spring 34 connected at its lower end to the upper shaft 26 and at its upper end to an eye-bolt 35 that extends downwardly from a bracket 36 which projects forwardly from the top of the slide 30 (Fig. 1).

A rack 37 secured to the front of the slide 30 meshes with a pinion 38 fixed to a shaft 39 that turns in bearing supports 40 extending from the frame 18 on either side of the slide 30. Only one of the supports 40 appears in Fig. 1. A sprocket on the end of the shaft 39 is rotated by a chain 42 which passes over a driving sprocket 43 at the low-speed end of reduction gearing 44. The reduction gearing 44 is rotated by an electric motor 45. All of the driving means for the shaft 39 are supported on the transversely movable frame 18. The motor 45 is reversible and is operated one way or the other to raise or lower the slide 30 for moving the shoe 24 out of or into contact with a billet.

The transversely movable frame 18 is shifted along the cantilever arm 15 by a double-acting fluid motor which appears in end elevation at 47 in Fig. 1. This motor includes a cylinder secured to the cantilever arm 15 and a piston rod 49 connected to the movable frame 18.

Figures 2, 3:
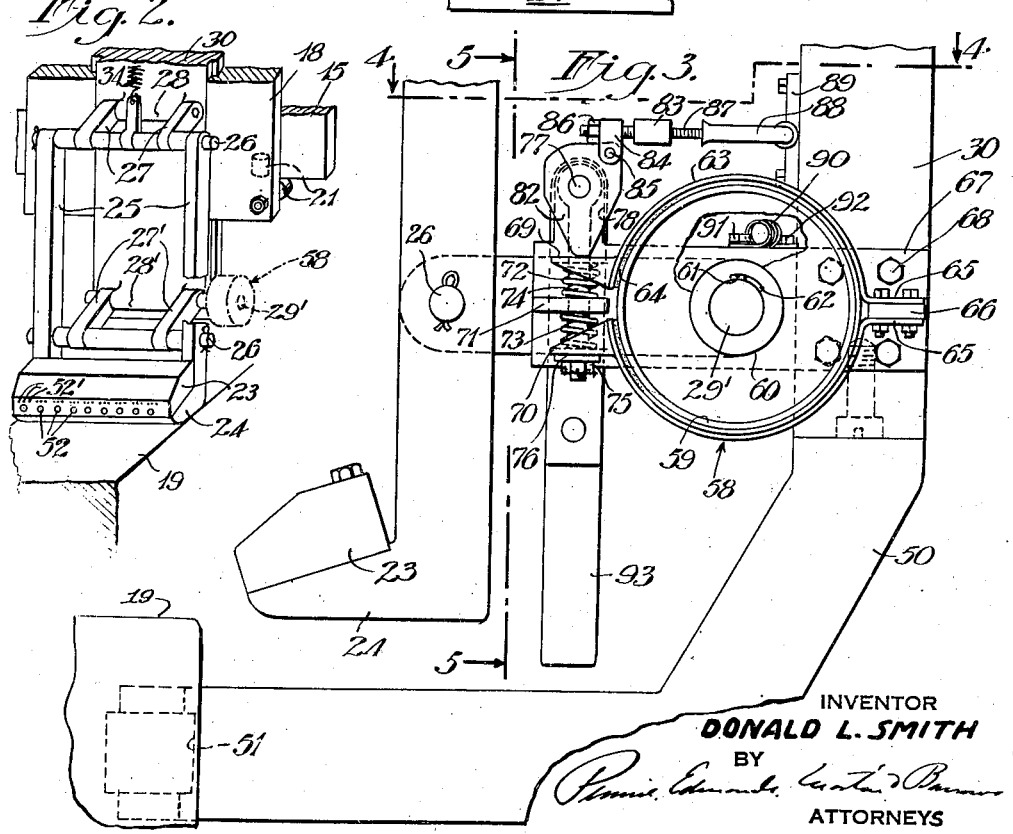
Fig. 2 is a partial perspective view of the folding parallelogram linkage which supports the scarfing torch.
Fig. 3 is a side elevation of the lower portion of the parallelogram linkage and brake shown in Fig. 1 drawn to a larger scale.

A guide 50 is secured to the lower end of the slide 30 and has rollers 51 for contact with the side face of the billet. The guide 50 and its rollers 51 are in such relation to the torch tip 23 that the tip is in the correct lateral position for scarfing the top surface of the billet 19 when the rollers 51 are against the side of the billet, i. e., the side farthest away from the reader in Fig. 1. The jets of scarfing oxygen issue from the torch tip through discharge orifices 52 (Fig. 2). The torch tip also has discharge orifices 52' for preheating flames in accordance with usual practice. The base or carriage 10 is moved along the track rails 12 by an electric motor 53 that drives the front wheels 11 through reduction gearing 54 and sprocket chains, only one of which appears at 55 in Fig. 1. There is a seat 57 for the operator who rides on the carriage 10.

The machine as thus far described is like that disclosed in the above-mentioned Anderson patent and normally operates as follows: The motor 53 is operated to drive the base or carriage 10 to a position along the rails 12 that locates the torch tip over the end of a billet. With the carriage 10 stopped in such position, and the torch at a level high enough to clear the top of the billet, the motor 47 is operated to move the frame 18 outwardly along the cantilever arm 15 until the rollers 51 of the guide 50 come into contact with the side of the billet 19. The combustible gas mixture issuing from the discharge orifices for the preheating flames is then lighted and the motor 45 is operated to lower the slide 30 so that the shoe 24 can rest on the upper surface of the billet. The torch tip is allowed to remain stationary in this position until the metal at the surface of the billet has been heated to kindling temperature. The scarfing oxygen is then turned on and the motor 53 started to move the torch tip along the length of the billet and thereby progressively remove the metal along the top surface of the billet.

It will now be seen that since the torch tip is supported on the forward end of the billet by the shoe 24 during the preheating period, there will be an unscarfed area at one end of each billet on which the shoe rested during the preheating period. The improvements added to the above-described machine which make is possible to scarf billets in such a way as to eliminate the unscarfed area on the billets will now be described:

The shaft 29' which pivotally connects the lower parallelogram links 27' to the lug 28' (Fig. 2), if not already rigidly connected to such links, is made rigid with them and is extended beyond one of the links and beyond the corresponding edge of the slide 30. In Fig. 2 the shaft 29' is thus extended to the right and the extending portion of the shaft has associated with it a brake 58 whose location is indicated by the dot-and-dash lines in Fig. 2. The details of the brake, the manner in which it is associated with the shaft 29', and the means for operating it, are shown in Figs. 1, 3, 4 and 5. Referring first to Fig. 3 a brake drum 59 has a hub 60 that fits over the end portion of the shaft 29' and that is connected with the shaft by a lost-motion connection comprising a key 61 extending radially from the shaft 29' into a keyway 62 in the hub of the brake drum. The keyway 62 is of greater angular extent than the key 61 and the brake drum has a lost motion equal to the difference in the angular extent between the keyway 62 and the key 61. The purpose of this lost-motion connection will hereinafter appear. A brake band 63 surrounds most of the periphery of the brake drum 59 and has a lining 64 which presses against the brake drum when the band 63 is contracted. In the particular construction illustrated the brake band is made in two parts each of which has a rearwardly extending section 65 clamped to a projection 66 on a bracket 67 that is secured to the edge of the previously described slide 30 by means of screws 68. The brake band 63, in the form illustrated, has no hinges and is contracted by bringing the two parts of the band together, this being permitted by their inherent resiliency.

The mechanism for contracting the brake band to apply the brake includes lugs 69 and 70 projecting from the forward ends of the upper and lower parts of the brake band 63. The above-mentioned bracket 67, secured to the edge of the slide 30, extends forwardly and has a flange 71 which extends between the lugs 69 and 70 on the brake band (see also Figs. 4 and 5). There are coil springs 72 and 73 located between the flange 71 and the lugs 69 and 70. These springs normally expand the brake band so that the brake lining 64 does not grip the brake drum. An eye-bolt 74 extends through the lugs 69 and 70 and through the flange 71 on the bracket 67. At the lower end of the eye-bolt there is a nut 75 that bears against the bottom lug 70 through a washer 76. A shaft 77 extends through the opening at the upper end of the eye-bolt. This shaft is supported near one of its ends in a vertical extension 78 on the bracket 67 and near its other end in one arm 79 of a bracket whose other arm 80 is secured to the front face of the slide 30 by screws 81, as best shown in Figs. 4 and 5. A cam element, having cam portions 82 and 82' (Figs. 3 and 5) lying on opposite sides of the eye-bolt 74 is secured to the shaft 77. The two cam portions contact with the top surface of the upper lug 69 on the brake band. The cam element may be moved angularly about the axis of the shaft 77 by a cam-actuating element 83 (Fig. 3) which is threaded through a link 84 connected to the upper end of the cam element by a pin 85. A lock nut 86 prevents the cam-actuating element 83 from turning in the link 84. When the cam element is rocked into the position shown in Fig. 3 the brake band is contracted against the tension of the coil springs 72 and 73 and the brake applied. There is a flat on the bottom of each portion of the cam element so that the cam will remain set in its brake-applying position. Counterclockwise angular movement of the cam element in Fig. 3 moves the flat cam faces of the cam portions away from the upper lug 69 on the brake band and permits the springs 72 and 73 to expand the brake band and release the brake.

The element 83 is attached to the end of a Bowden wire 87 which passes through a guide 88 attached to the slide 30 by a bracket 89. This bracket permits the guide 88 to move angularly as much as necessary to accommodate itself to changes in alignment of the cam-actuating element 83 during angular movement of the cam element. The Bowden wire extends to any convenient location from which it is desired to actuate the cam element and is there connected to a handle 87' (Fig. 4). By pulling on the handle it is apparent that the cam element will be turned clockwise about the axis of the shaft 77 to apply the brake.

The lost motion of the brake drum 59 on the shaft 29' is taken up in one direction by a tension spring 90 attached at one end to the hub of the brake drum by a screw 91 and at the other end to the bracket 67 by a screw 92 (Fig. 3).

When operating the scarfing machine with the added improvements herein described, the torch carriage is moved to a postion in which the torch tip is over one end of the billet. The slide 30 is then lowered until the shoe 24 contacts with the upper surface of the billet. The cam element 82—82' is then actuated through the Bowden wire 87 by pulling on the handle 87' to apply the brake. Since the brake prevents the shaft 29' from turning it renders the entire parallelogram linkage rigid. The torch carriage is then moved back until the shoe 24 clears the end of the billet and the torch tip is in position to direct the preheating flames and the scarfing oxygen on the top surface of the billet over an area which begins at the very end of the billet. The torch tip is shown in this position in Figs. 1 and 3. When the shoe clears the end of the billet during the backward movement of the torch carriage the torch tip supported at the same level as when it was resting on the billet surface by reason of the fact that the parallelogram linkage has been rendered rigid or locked by the application of the brake. At the end of the preheating period the scarfing oxygen is turned on and the torch carriage is started. The shoe 24 moves over the top surface of the billet, and as soon as it has moved beyond the end of the billet and in position to be supported by it, the brake is automatically released by a lever 93 rigidly secured to the shaft 77 (Figs. 3 and 5). The lower end of the lever strikes the end of the billet and is displaced by the continued movement of the torch carriage, thereby rocking the shaft 77 and moving the cam element 82—82' to its brake-releasing position. The scarfing operation then continues with the shoe and torch tip now free to float vertically and follow vertical variations in the surface of the billet by reason of the fact that the parallelogram linkage has again been rendered flexible by the tripping of the brake.

The purpose of the lost-motion connection between the shaft 29' and the hub of the brake is to prevent damage to the equipment in the event that the shoe 24 is originally set at a slightly lower level than it should be, or in the event that the billet is warped and its top surface forces the shoe upwardly before the brake has been released. As will be seen from Fig. 3 the last motion is in a direction to permit a limited upward movement of the shoe 24 and the torch tip even though the brake is applied.

It will now be apparent that with the added improvements herein described, a scarfing machine of the type shown, or a similar one in which a torch tip is normally permitted vertical movement so that it can follow vertical variations in the surface of a work-piece, can be used to scarf billets or other work-pieces throughout their entire length since the area at the end of the billet on which it is usually necessary to support the torch tip during the preheating period can be scarfed as well as the other portions of the billet surface because the torch tip can be temporarily held against vertical movement and supported at the desired level in advance of the end of the billet where the preheating flames and the scarfing oxygen jets can be directed on an area which begins at the very end of the billet.

I claim:

1. In a scarfing machine including a scarfing torch having a tip adapted to direct preheating flames and scarfing oxygen against the top surface of a work-piece, means for producing relative movement between the torch tip and the work, supporting means for the torch including a support on which the torch tip is carried and that is capable of vertical movement whereby the torch tip can float and follow vertical variations in the surface of the work-piece, the combination therewith of locking means adapted to be manually operated to hold said tip support against vertical movement whereby the torch tip can be supported in advance of the end of the work-piece and at the proper level to start the scarfing operation at the very end of the work-piece, and means operatively associated with said locking means and having a portion adapted to be engaged by the end of the work-piece when the relative movement between the torch tip and the work-piece has brought the torch tip to a position over the end of the work-piece for releasing said locking means to thereby allow vertical movement of the tip support.

2. In a scarfing machine including a torch carriage that is movable along a course parallel to the work-piece to be scarfed, a scarfing torch having a tip adapted to direct preheating flames and scarfing oxygen against the top surface of the work-piece, and means for mounting the torch on the carriage including a support for the torch tip that is capable of vertical movement whereby the torch tip can float and follow vertical variations in the surface of the work-piece when the tip is advanced along the work surface by the carriage during the scarfing operation, the combination therewith of locking means adapted to be manually operated to hold said support against vertical movement whereby the torch tip can be supported in advance of the end of the work-piece and at the proper level to start the scarfing operation at the very end of the work-piece, and means operatively associated with said locking means and having a portion adapted to engage the end of the work-piece when movement of the carriage has brought the torch tip to a position over the end of the work-piece for releasing said locking means to thereafter allow vertical movement of said tip support and vertical floating of the torch tip.

3. In a scarfing machine including a base, a scarfing torch having a tip adapted to direct preheating flames and scarfing oxygen against the top surface of a work-piece, means for producing relative movement between said base and the work-piece, the means for mounting the torch on the base including a support on which the torch tip is carried, a link pivoted to said support, a rotatable shaft fixed to the link whereby when rotation of the shaft is permitted it allows said tip support to move vertically so that the tip can float and follow vertical variations in the surface of the work-piece, the combination therewith of a brake adapted to prevent rotation of said shaft, manually operable means for applying the brake whereby the torch tip can be held against vertical movement and supported in advance of the end of the work-piece and at the proper level to start the scarfing operation at the very end of the work-piece, and means operatively associated with the brake and having a portion adapted to be engaged by the end of the work-piece when the relative movement between said base and the work-piece has brought the torch tip to a position over the end of the work-piece for releasing the brake thereby then allowing vertical movement of the tip support and vertical floating of the torch tip.

4. In a scarfing machine including a base, a scarfing torch having a tip adapted to direct preheating flames and scarfing oxygen against the top surface of a work-piece, means for producing relative movement between said base and the work-piece, the means for mounting the torch on the base including folding parallelogram linkage having upper and lower pairs of parallel links, each pair of said links being pivotally mounted at one end so as to be movable about a horizontal axis, a member pivotally connected to the other ends of the links so as to be movable vertically, the torch tip being carried by said member, one of said horizontal axes being the axis of a shaft to which the corresponding links are rigidly connected so that when the shaft is permitted to rotate said member can move vertically and the tip can float and follow vertical variations in the surface of the work-piece, the combination therewith of a brake adapted to prevent rotation of said shaft, manually operable means for applying the brake whereby said member can be held against vertical movement and the tip supported in advance of the end of the work-piece and at the proper level to start the scarfing operation at the very end of the work-piece, and means operatively associated with the brake and having a portion adapted to be engaged by the end of the work-piece when the relative movement between said base and the work-piece has brought the torch tip to a position over the end of the work-piece for releasing the brake thereby then allowing vertical movement of said member and vertical floating of the torch tip.

5. In a scarfing machine, the combination of a base, a scarfing torch mounted thereon and having a tip, means for producing relative movement between the base and the work-piece to be scarfed, means for supporting the torch tip so that it can float and follow vertical variations in the surface of the work-piece, locking means adapted to hold the supporting means for the torch tip against vertical movement including a rotatable member and a friction brake operatively connected thereto, the operative connection including a lost-motion means which permits limited vertical movement of the torch tip supporting means when said friction brake is applied, and means for applying and releasing said friction brake to render said locking means effective and ineffective whereby the scarfing operation can be started when the torch tip is in advance of the end of the work-piece unsupported by the work-piece itself and whereby the freedom of the tip to float and follow vertical variations in the work surface can be restored when the relative movement between the base and the work-piece has brought the tip to a position over the end of the work-piece.

6. In a scarfing machine, a combination as set forth in claim 5, in which the friction brake has a brake drum member mounted on said rotatable member and in which the lost-motion means comprises a key-way formed in one of said members and a key of smaller angular extent than the key-way mounted on the other of said members, and a spring for taking up the lost motion between said members.

DONALD L. SMITH.

REFERENCES CITED

The following references are of record in the file of this patent:

UNITED STATES PATENTS

| Number | Name | Date |
|---|---|---|
| 1,543,647 | White | June 23, 1925 |
| 2,016,414 | Cramer | Oct. 8, 1935 |
| 2,200,259 | Bucknam et al. | May 14, 1940 |
| 2,203,211 | Bucknam | June 4, 1940 |
| 2,223,452 | Jones | Dec. 3, 1940 |
| 2,285,518 | Jones | June 9, 1942 |
| 2,338,725 | Larson | Jan. 11, 1944 |
| 2,363,036 | Anderson | Nov. 21, 1944 |
| 2,380,569 | Anderson | July 31, 1945 |